United States Patent
Gelderloos et al.

(10) Patent No.: US 6,545,853 B1
(45) Date of Patent: Apr. 8, 2003

(54) ALTERNATE GROUNDING METHOD

(75) Inventors: Carl J. Gelderloos, Redondo Beach, CA (US); Phillip L. Leung, La Canada, CA (US); Dilip D. Patel, Cerritos, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 416 days.

(21) Appl. No.: 09/613,873

(22) Filed: Jul. 10, 2000

(51) Int. Cl.$^7$ ................................................ H05F 3/00
(52) U.S. Cl. ........................ 361/218; 361/212; 361/216
(58) Field of Search ............................... 361/212, 216, 361/218; 244/173, 158 R, 1 A; 136/292, 243

(56) References Cited

U.S. PATENT DOCUMENTS

| | | | | |
|---|---|---|---|---|
| 4,329,731 A | * | 5/1982 | Meulenberg, Jr. | 361/218 |
| 4,489,906 A | * | 12/1984 | Fellas | 244/158 A |
| 5,598,989 A | * | 2/1997 | Ross et al. | 244/158 A |
| 6,260,808 B1 | * | 7/2001 | Bodeau et al. | 244/173 |

* cited by examiner

Primary Examiner—Stephen W. Jackson
Assistant Examiner—James A. Demakis
(74) Attorney, Agent, or Firm—Terje Gudmestad, Esq.

(57) ABSTRACT

An electrical ground (10) for use in a spacecraft comprising, a first surface (12) capable of emitting electrons by photoemission, at least one isolated conductive surface (18) and at least one conductive connector (20) in connection with the first surface (12) and the isolated conductive surface (18) such that excess electrical charge developed in the isolated conductive surface (18) is dispersed into the first surface (12).

12 Claims, 1 Drawing Sheet

US 6,545,853 B1

ALTERNATE GROUNDING METHOD

TECHNICAL FIELD

The present invention relates generally to a method of grounding and more particularly to a method of electrical grounding for use in spacecraft design.

BACKGROUND ART

Satellites and other spacecraft are known to experience geomagnetic substorms and similar phenomenon while in space. These phenomena can impart large negative electrical potentials to isolated metal components on the spacecraft. When large potential differences are present between components on the spacecraft, electrostatic discharges are known to occur.

Electrostatic discharges within the spacecraft are highly undesirable and can pose hazards to the operation and performance of the spacecraft. It is known that electrostatic discharges have caused permanent electrical degradation to solar arrays when in orbit. The electrostatic discharges are also known to create high density plasma which can create temporary electrical paths between solar cells. These temporary electrical paths are known to result in localized heating and electrical shorts. Even when electrostatic discharges do not damage the spacecraft, their presence can interfere with spacecraft performance. The costs involved in spacecraft design, production, and launch make the presence of such electrostatic discharges and their resulting effects on the spacecraft unacceptable.

It is known that electrostatic discharges can be minimized in spacecraft by grounding all isolated metal surfaces to the spacecraft electrical system ground. However, grounding each isolated metal surface to the spacecraft electrical system ground can add undesirable weight and cost to the design of the spacecraft. In addition, the area within the spacecraft is often limited and may make the grounding of some components unfeasible. Furthermore, present designs and components often cannot be retrofitted to accomplish such a grounding procedure.

There is, therefore, a need for a method of reducing electrostatic discharges in isolated metal components without the need to attach such components to the spacecraft electrical system ground.

SUMMARY OF THE INVENTION

It is therefore an object of the present invention to provide an improved grounding method for use in a spacecraft that reduces the electrostatic discharge in isolated conductive components without the need to electrically attach such components to the spacecraft electrical system ground.

In accordance with the objects of the present invention, an electrical ground for use in a spacecraft is provided. The electrical ground utilizes a first surface, exposed to sunlight. The first surface is capable of emitting electrons by photoemission when exposed to sunlight. Isolated conductive surfaces are in electrical communication with the first surface through the use of conductive connectors that allow electric charge to flow from the isolated conductive surfaces to the first surface, where the charge may be dispersed by photoemission.

Other objects and features of the present invention will become apparent when viewed in light of the detailed description of the preferred embodiment when taken in conjunction with the attached drawings and appended claims.

DESCRIPTION OF THE PREFERRED EMBODIMENTS

Figure 1:
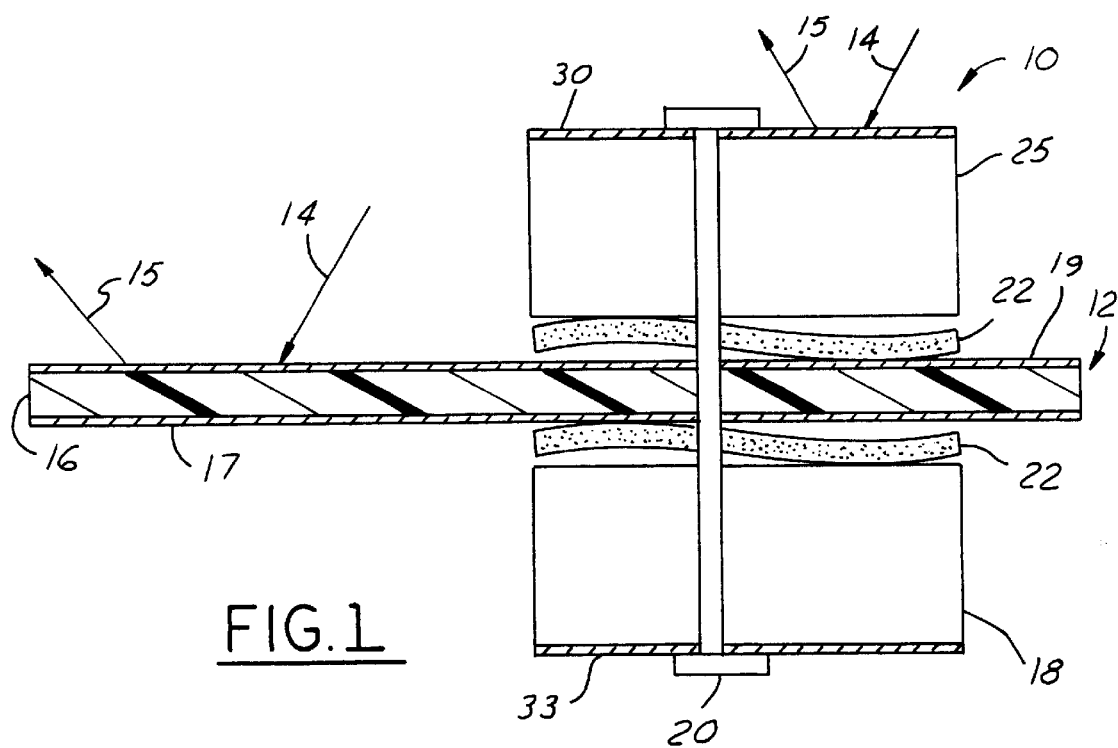
FIG. 1 is a cross-sectional view of a grounding method in accordance with one preferred embodiment of the present invention.

Referring now to FIG. 1, which is a cross-sectional view of an electrical ground 10 in accordance with the present invention. The electrical ground 10 is preferably for use in satellites or other spacecraft. However, the electrical ground 10 may be used in a variety of other applications.

The electrical ground 10 includes a first surface 12. When the first surface 12 is exposed to sunlight, generally referred to by 14, a process called photoemission takes place. During the process of photoemission, electrons 15 within the first surface 12 are dispersed due to photons from the sunlight 14. This process is known and documented to occur on devices such as some reflective concentrators used in solar arrays, although photoemission may be present in a variety of devices. In one embodiment, the first surface 12 is a reflective concentrator such as those used in satellites. The first surface 12 in this embodiment is comprised of a thin film material 16 such as a polymide material with a coating 17, 19 such as aluminum or silver. Although the first surface 12 has been described in a particular embodiment, it should be understood that a variety of forms and materials may be used to construct the first surface 12 such that photoemission of electrons 15 takes place when the first surface 12 is exposed to sunlight 14. The first surface need not be a reflective concentrator, but may be a thermal blanket or any other surface on the spacecraft that experiences photoemission of electrons 15 during exposure to sunlight 14.

The electrical ground 10 also contains at least one isolated conductive surface 18. These isolated conductive surfaces 18, when exposed to geomagnetic substorms or other phenomenon, can develop large electric potential charges. If these large electric potential charges are not dispersed, they can potentially cause electrostatic discharges that are highly undesirable. For this reason, the electrical ground 10 further includes a conductive connector 20. The conductive connector 20, places the isolated conductive surface 18 in electrical connection with the first surface 12. Excess electrical potential charges in the isolated conductive surface 18 are thereby allowed to flow from the isolated conductive surface 18, through the conductive connector 20, and into the first surface 12. Once the charge reaches the first surface 12, it can be dispersed through photoemission. Although the conductive connector 20 is shown in direct connection with both the isolated conductive surface 18 and the first surface 12, it should be understood that it need not be to accomplish its goal of placing the isolated conductive surface 18 in electrical connection with the first surface 12. In other embodiments, the conductive connector 20 can connect the isolated conductive surface 18 with any surface in electrical connection with the first surface 12 and thereby place the isolated conductive surface 18 in electrical connection with the first surface 12.

The isolated conductive surface 18 can be any component within the spacecraft with a conductive material capable of developing a charge due to geomagnetic substorms or other phenomenon. In one embodiment, the isolated conductive surface 18 is any conductive material with a surface area larger than approximately one square centimeter, although precisely which components need to be grounded can be determined by individual design requirements. The isolated conductive surface 18 in one embodiment is held in place next to the first surface 12 through the use of an adhesive layer 22. In other embodiments, however, the isolated conductive surface 18 need not be attached at all to the first surface 12 or may be attached by a variety of known methods.

The conductive connector 20 can be any of a variety of methods of placing the isolated conductive surface 18 into electrical communication with the first surface 12. In the embodiment shown in FIG. 1, the conductive connector 20 is a simple conductive grommet. In other embodiments, the conductive connector 20 may any electrically conductive material. The electrically conductive material may be attached to the isolated conductive surface 18 and the first surface 12 by any method including but not limited to the use of electrically conductive adhesives. In addition, the conductive connector 20 need not directly attach the isolated conductive surface 18 with the first surface 12 but may connect the isolated conductive surface with any surface in electrical connection with the first surface 12.

When the conductive connector 20 is a structurally rigid device such as a grommet, and is used in conjunction with a first surface 12 that is structurally weak or flexible, the isolated conductive surface 18 can be connected to the first surface 12 in a variety of fashions that do not damage the first surface 12. In one embodiment, a second component 25 is attached to the first surface 12 on the side opposite the isolated conductive surface 18. The conductive connector 20 can be used to sandwich the first surface 12 between the second component 25 and the isolated conductive surface 18, while additionally providing electrical communication between the isolated conductive surface 18 and the first surface 12. By pressing the isolated conductive surface 18 and the second component 25 against the first surface 12, the risk of damage to the first surface 12 by the conductive connector 20 is reduced. In other embodiments, a simple washer system or any other structural solution may be used.

Although the first surface 12 has been described as a specific surface in FIG. 1, it should be understood that the first surface 12 can be any surface experiencing photoemission. In an alternate embodiment, the first surface 12 can be a photoemitting surface 30 located on the second component 25. In this embodiment, excess electrical potential charges can pass from the isolated conductive surface 18, or an isolated coating 33, to the photoemitting surface 30. It should also be understood that the electrical ground 10 need not be an absolute ground. The alternate ground 10 needs only to lower the electrical potential to a level capable of preventing electrostatic discharges. The potential can vary within the range of the photoemission energy of the photoelectrons on the photoemitting surface 30. The isolated conductive surface 18 need not be placed in direct electrical contact with all of the exposed surfaces, but rather need only connect with a surface sufficient to limit the electrical potential of the isolated conductive surface 18 and thereby limit the opportunity for damaging electrostatic discharge.

While particular embodiments of the invention have been shown and described, numerous variations and alternate embodiments will occur to those skilled in the art. Accordingly, it is intended that the invention be limited only in terms of the appended claims.

What is claimed is:

1. An electrical ground for use in a spacecraft comprising:
    a first surface intended to be exposed to sunlight, said first surface capable of emitting electrons by photoemission;
    at least one isolated conductive surface; and
    at least one conductive connector in electrical connection with said first surface and said at least one isolated conductive surface such that electrical charge developed in said at least one isolated conductive surface is dispersed into said first surface.

2. An electrical ground for use in a spacecraft as recited in claim 1, wherein said at least one conductive connector is a grommet.

3. An electrical ground for use in a spacecraft as recited in claim 1, wherein said first surface is a solar concentrator.

4. An electrical ground for use in a spacecraft as recited in claim 1, wherein said first surface is a thin film material coated with aluminum.

5. An electrical ground for use in a spacecraft as recited in claim 1, wherein said at least one isolated conductive surface is held against said first surface by an adhesive layer.

6. An electrical ground for use in a spacecraft as recited in claim 1, wherein said at least one isolated conductive surface is held against said first surface by said at least one conductive connector.

7. An electrical ground for use in a spacecraft as recited in claim 1, further comprising:
    at least one second component, said at least one second component and said at least one isolated conductive surface held against said first surface by said at least one conductive connector.

8. An electrical ground for use in a spacecraft as recited in claim 1, further comprising:
    at least one second component, said at least one second component and said at least one isolated conductive surface held against said first surface by an adhesive layer.

9. A method of dispersing charge from an isolated conductive surface comprising the steps of:
    passing the charge from the isolated conductive surface into a conductive connector;
    passing the charge from said conductive connector into a first surface, said first surface experiencing photoemission;
    dispersing the charge from said first surface by photoemission.

10. A method of dispersing charge as described in claim 9, for use in a spacecraft.

11. A method of dispersing charge as described in claim 9, for use in a satellite.

12. A method of dispersing charge as described in claim 9, wherein said conductive connector is a grommet.

* * * * *